United States Patent [19]
Lloyd et al.

[11] Patent Number: 5,211,387
[45] Date of Patent: May 18, 1993

[54] METHOD AND APPARATUS FOR FEEDING ARTICLES

[75] Inventors: Paul D. V. Lloyd; Michael Potter, both of Hampshire, England

[73] Assignee: De La Rue Systems Limited, England

[21] Appl. No.: 810,566

[22] Filed: Dec. 20, 1991

Related U.S. Application Data

[63] Continuation of Ser. No. 502,578, Mar. 30, 1990, abandoned.

[30] Foreign Application Priority Data

Mar. 31, 1989 [GB] United Kingdom ............... 8907339

[51] Int. Cl.⁵ .............................................. B65H 7/14
[52] U.S. Cl. .................................. 271/111; 271/202; 271/265
[58] Field of Search ............... 271/110, 111, 265, 202

[56] References Cited

U.S. PATENT DOCUMENTS

| | | | |
|---|---|---|---|
| 4,171,130 | 10/1979 | Jeschke | 271/111 X |
| 4,331,328 | 5/1982 | Fasig | 271/111 X |
| 4,541,624 | 9/1985 | Sasage et al. | 271/12 |
| 4,640,408 | 2/1987 | Eaves | 198/460 |
| 4,691,912 | 9/1987 | Gillmann | 271/34 X |
| 4,761,002 | 8/1988 | Reed | 271/111 |
| 4,787,620 | 11/1988 | Goldkuhle | 271/111 |
| 4,893,804 | 1/1990 | Sasage | 271/111 X |

FOREIGN PATENT DOCUMENTS

| | | |
|---|---|---|
| 0057810 | 2/1981 | European Pat. Off. . |
| 0168784 | 7/1985 | European Pat. Off. . |
| 3612021 | 4/1986 | Fed. Rep. of Germany . |
| 2310948 | 5/1976 | France . |
| 2203413 | 4/1988 | United Kingdom . |

*Primary Examiner*—Richard A. Schacher
*Attorney, Agent, or Firm*—Ostrolenk, Faber, Gerb & Soffen

[57] ABSTRACT

Apparatus for feeding articles, such as banknotes, along a feed path comprises first and second separately driven feed systems the second feed system being operated at a substantially constant speed. The first feed system feeds articles to the second feed system. A sensing system includes a sensor for sensing the passage of articles. The sensor is connected to a motor control system which controls the feed rate of the first feed system by controlling a motor of the first feed system so that the separation between successive articles passing through the second feed system satisfies at least one predetermined condition.

18 Claims, 2 Drawing Sheets

METHOD AND APPARATUS FOR FEEDING ARTICLES

This is a continuation of application Ser. No. 07/502,578, filed on Mar. 30, 1990, now abandoned.

FIELD OF THE INVENTION

The invention relates to methods and apparatus for feeding articles, for example feeding sheets such as banknotes.

DESCRIPTION OF THE PRIOR ART

There are many applications in which articles are fed from a first feed system such as a supply to a second feed system in which characteristics of the articles are monitored. The articles are then delivered to one of a number of subsidiary feed paths depending upon the monitored characteristics. For example, in the case of banknote sorting and counting machines, banknotes are monitored for their condition and number. For successful monitoring there has to be a minimum separation (in time, distance or a combination of these) between the passage of successive articles past the diverter to allow the diverter to divert the successive articles to different destinations. In practice, if a pair of articles does not have the required minimum separation, there is a risk of misoperation and so both articles are routed to a dump or cull destination. Furthermore, in order to allow conventional monitoring systems to operate, the article feed rate has to be slow enough to allow the detector system to identify and categorise each article. In the case of banknotes this means that there must be a minimum separation between the leading edges of consecutive articles in the second feed system. This requirement is different from the inter-article separation requirement mentioned above (i.e. the separation between successive articles) if the apparatus is able to accept a mix of articles, such as articles of various lengths. In the case of a mixture of articles of different characteristics, if the detector system which detects the type of article being fed did not have sufficient time to select the correct destination for an article, before the arrival of the next article, one of the articles must be routed to a cull destination leading to a high article reject rate.

In the past, in order to satisfy the above requirements, the feed rate of the first feed system has been adjusted prior to operation so that the number of articles which has to be dumped is acceptably small. This requires that the mean distance between articles is considerably larger than the required minimum, because of uncertainties in the feeder performance and the condition of the articles to be sorted. Some machines currently available operate at a single fixed feed rate while others allow the feed rate to be selected according to the length of the expected articles, the feed rate being set up prior to operation. See for example GB-A-2203413.

U.S. Pat. No. 4,573,673 describes a franking machine in which the problem of handling envelopes of different lengths is addressed. In this system, the first transport system feeds the lowermost envelope from the stack into a second transport system which feeds the envelopes to a franking position. In order for each envelope to be franked in the correct position, as soon as an upstream sensor associated with the second transport system senses the arrival of a leading edge of an envelope the first transport system is stopped to prevent further envelopes from being fed. As the leading edge of an envelope arrives at a downstream sensor the speed of the second transport system is reduced so that when the envelope reaches the franking position the second transport system also is stopped to allow the franking operation to take place. This system leads to a comparatively slow operation due to the need to stop both transport systems during the passage of each envelope.

EP-A-0168784 describes a system for controlling the synchronisation of a printing operation to the arrival of cardboard sheets. Synchronisation systems of this type are not helpful in dealing with the problems set out above since they require prior knowledge of the operation of the printing operation.

GB-A-2189760 describes a complex conveyor system for condensing stacks of sheets into a continuous line. This is exactly opposite to the requirement of the invention which is to ensure that sheets are sufficiently spaced to allow the operation of for example diverters and the like.

GB-A-1517588 describes an article feed system in which an upstream feed for delivering articles from a stack is stopped during the passage of each sheet. This leads to a comparatively long operation time.

U.S. Pat. No. 4,541,624 describes two consecutive feed systems for feeding sheets of different lengths in which the arrival of a leading edge of a sheet at a sensor associated with the downstream system is used to control the speeds at which successive articles and the article sensed are fed. This is a relatively complex system since it operates on the sensed sheet as well as later sheets. The method thus ensures that every sheet is fed at the ideal distance from the preceeding sheet. It therefore requires feed systems whose speeds can be changed by a considerable amount during the time taken to feed one note.

U.S. Pat. No. 460,408 also describes a synchronisation system which would not be suitable for solving the problem addressed by the present invention.

SUMMARY OF THE INVENTION

In accordance with one aspect of the present invention, a method of feeding articles along a feed path comprising first and second separately driven feed systems in which the articles are fed from the first to the second feed system comprises sensing the separation between articles fed through the second feed system; and, during the feeding of articles, adjusting the rate at which articles are fed by the first feed system so that the separation between successive articles passing through the second feed system satisfies at least one predetermined condition, characterised in that the second feed system operates at a substantially constant speed.

In accordance with a second aspect of the present invention, apparatus for feeding articles along a feed path comprises first and second separately driven feed systems, wherein the first feed system feeds articles to the second feed system, and wherein the second feed system operates at a substantially constant rate; a sensing system including a sensor for sensing the separation between articles fed through the second feed system; and control means responsive to the sensing system to control the feed rate of the first feed system during the feeding of articles so that the distance between successive articles passing through the second feed system satisfies at least one predetermined condition.

We have devised a new method and apparatus in which the feed rate of the first feed system is adjusted during feeding so that a reasonable compromise is achieved between a high feed rate and a low reject rate. Thus, methods and apparatus according to the invention do not attempt to optimise the separation of each pair of articles but instead optimise the mean separation of articles.

Running the second feed system substantially continuously has the advantage that this system can form the main transport of a sorting machine.

For example, the sensing step could comprise sensing one or both of the distance and time between successive articles and the article feed rate of the first feed system could be adjusted so that one or both of the distance and time between the trailing edge of one article and the leading edge of the next article is maintained at or above a minimum value.

In the preferred example, the feed rate is adjusted to maintain acceptable separations between successive leading edges and between successive articles. The advantage of monitoring time separation is that variations in the feed rate of the second feed system (which is not controllable) can be compensated.

Preferably, the control means controls the speed of operation of a drive motor of the first feed system. Typically, the first feed system will be continuously driven.

In one example, the first feed system supplies articles from a store.

In order to optimise operation, the method preferably further comprises increasing the feed rate of the first feed system after a predetermined number of articles have passed through the second feed system without the or one of the predetermined conditions being satisfied.

In one arrangement, the control means comprises a first counter holding a count which defines the feed rate of the first feed system and which is incremented after the passage of a predetermined number of articles and which is decremented when a predetermined condition is not satisfied.

In this case the apparatus may further comprise a second counter which generates a count value corresponding to the separation between successive articles, and a comparator for comparing the count value in the second counter with a minimum value, the comparator causing the count in the first counter to be decremented when the minimum count is not exceeded.

In a preferred example, two second counters are provided, one of which derives a count value related to the separation (time or distance) between the trailing edge of one article and the leading edge of the next article and the other of which detects the separation between successive leading edges.

As mentioned above, the invention is particularly useful with sheet feeding apparatus such as banknote feeding apparatus in which high throughput is particularly important.

Although the invention is primarily concerned with ensuring a sufficient separation between articles to allow operation of diverting mechanisms and the like, it may also be used to ensure sufficient separation for other purposes such as to ensure that other sensors can operate satisfactorily.

BRIEF DESCRIPTION OF THE DRAWINGS

An example of banknote feeding apparatus for performing a method according to the present invention will now be described with reference to the accompanying drawings, in which.

DETAILED DESCRIPTION OF THE EMBODIMENTS

Figure 1:
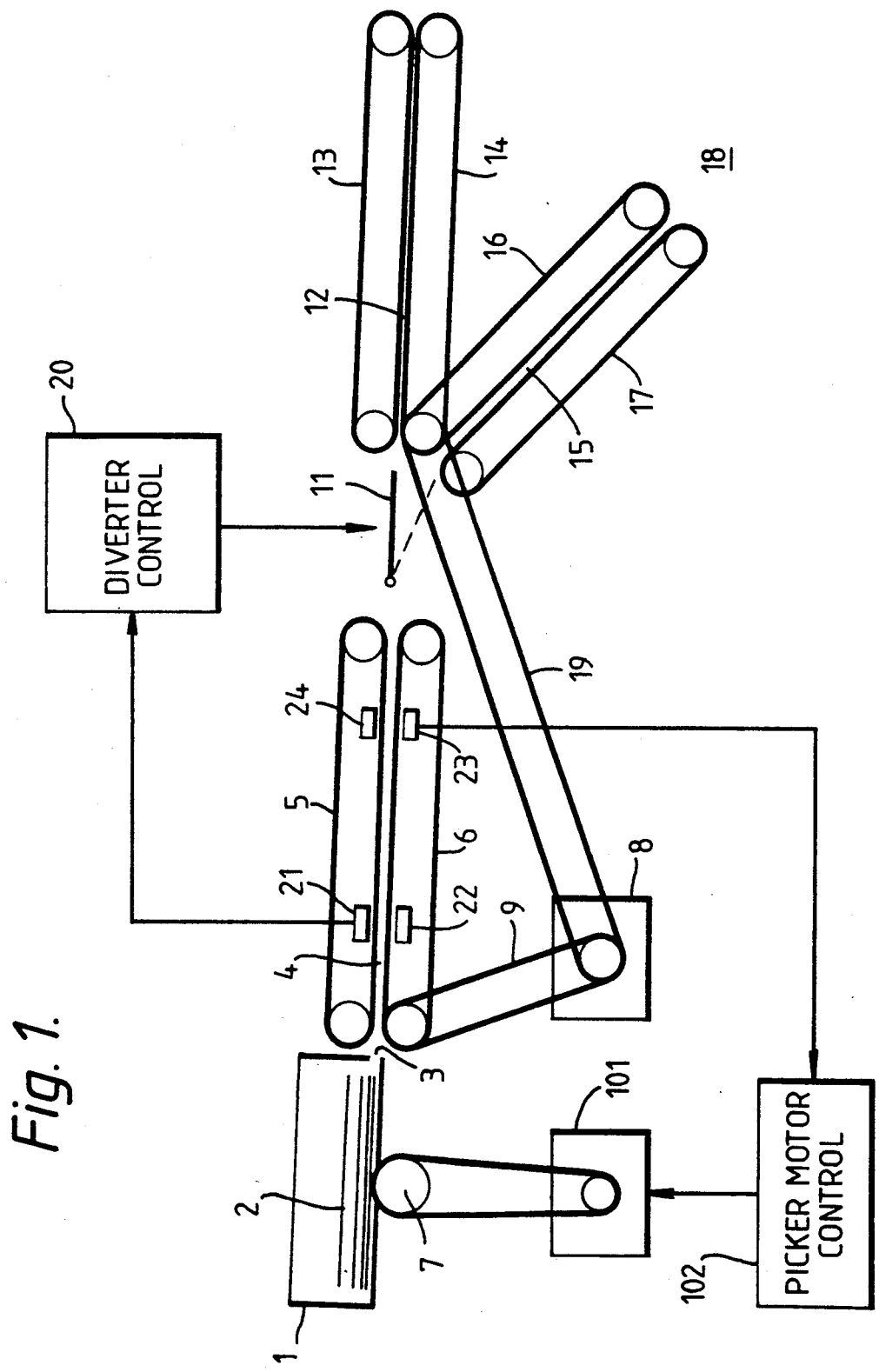
FIG. 1 is a schematic block diagram of the apparatus.

The apparatus shown in FIG. 1 comprises a banknote hopper 1 in which a stack of banknotes 2 to be fed is positioned. The hopper 1 has an exit opening 3 in alignment with a feed path 4 defined between a pair of drive belts 5, 6. A picker wheel 7 is mounted beneath the hopper 1 and protrudes through an aperture (not shown) in the base of the hopper 1 so as to nudge the lowermost note in the stack 2 out of the exit opening 3. The picker wheel 7 is driven by a motor 101 which is controlled by a control system 102, the wheel 7 and motor 101 defining a first feed system. The belts 5, 6 are driven by a separate drive motor 8 via a drive belt 9 defining a second feed system.

Notes drawn out through the exit aperture 3 are fed by the belts 5, 6 along the feed path 4 to a pivoted diverter 11 which in the position shown by a solid line allows the notes to feed into a second feed path 12 defined by belts 13, 14 and in the dashed line position feeds notes into a feed path 15 between belts 16, 17. The feed path 12 will feed the banknotes either to an output station or further processing apparatus (not shown) while the feed path 15 feeds the banknotes to a dump 18. The belts 13-16 are driven by the motor 8 via a drive belt 19.

The position of the diverter 11 is controlled in a conventional manner by a diverter control system 20 which is coupled with a light sensor and light source system 21, 22. The sensor system 21, 22 provides signals indicative of some characteristic of the note such as its denomination and the diverter 11 is controlled accordingly to pass banknotes of a particular characteristic (e.g. denomination) along the feed path 12 but to reject other banknotes.

The sensor/source system 21, 22 requires there to be a certain separation (in distance and time) between successive notes and the diverter 11 also requires there to be a sufficient separation such that it can switch between the two positions and divert successive notes along different paths. To ensure that a sufficient gap is present, a second sensor and source system 23, 24 is provided downstream of the system 21, 22. The system 23, 24 is connected to the picker motor control system 102 the output of which controls the speed of the motor 101.

Figure 2:
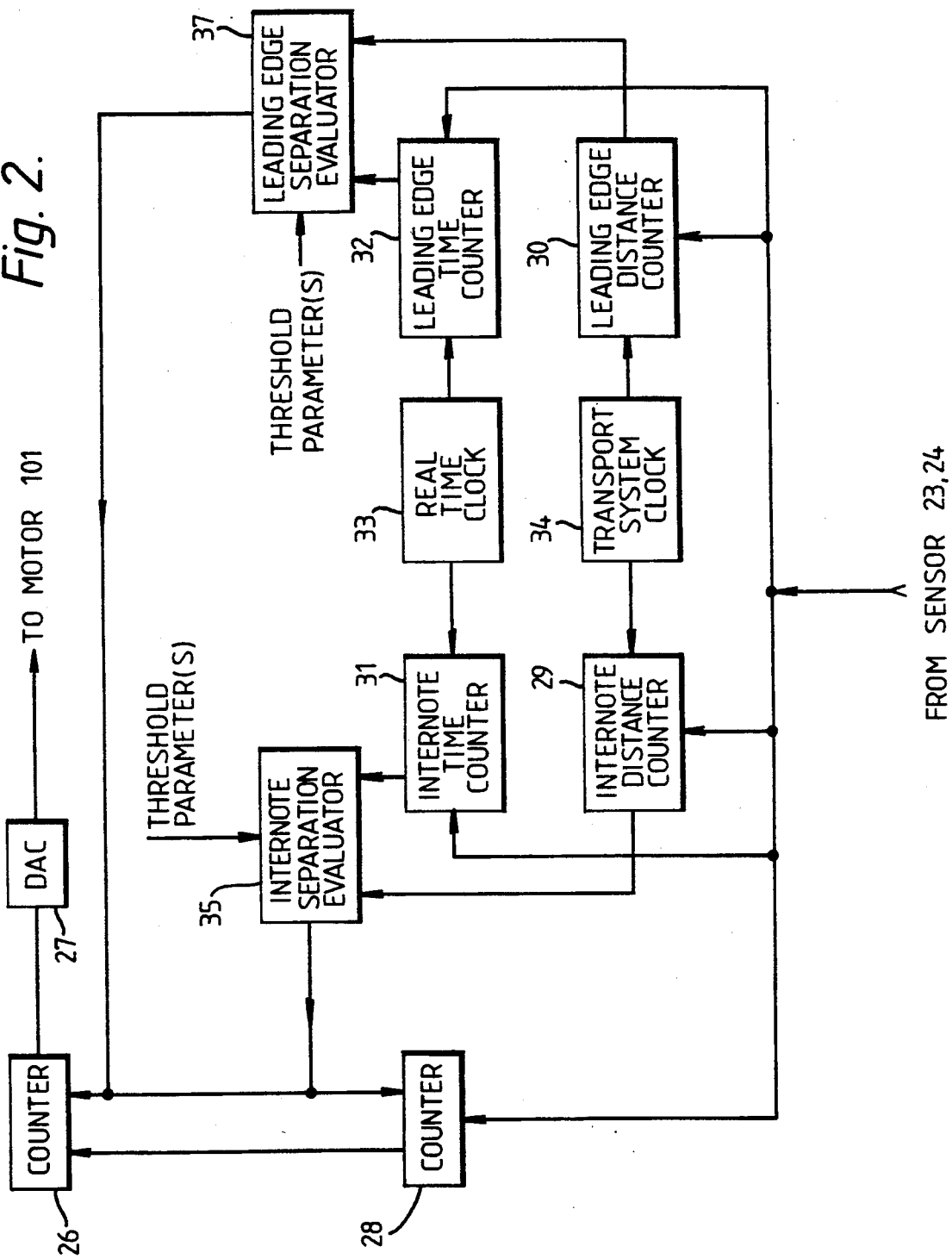
FIG. 2 is a block diagram of the picker motor control system.

FIG. 2 illustrates the picker motor control system 102 in more detail. The speed of the motor 101 is controlled by the contents of a counter 26 whose current count value is output to a digital-to-analogue converter 27 which is coupled to the motor 101 to control motor speed.

When a note passes along the path 4, the output from the sensor system 23, 24 will change as the note arrives at the sensor system and as the note leaves the sensor system. The output signal from the sensor system 23, 24 is fed to a counter 28, an inter-note distance counter 29, a leading edge distance counter 30, an inter-note time counter 31, and a leading edge time counter 32. A real time clock 33 is coupled to the inter-note and leading edge counters 31, 32 and a transport system clock 34 is coupled to the inter-note distance and leading edge distance counters 29, 30.

When the leading edge of a note is sensed by the sensor system 23, 24, an appropriate output signal is generated which causes the counter 28 to increment by one, the counter 28 acting as a note counter. This leading edge signal also resets the leading edge distance and time counters 30, 32. These counters 30, 32 then start to increment from zero at a rate determined by the transport system and real time clocks 34, 33 respectively.

The leading edge signal also acts as a reset and a disenable signal for the inter-note time and distance counters 29, 31.

Upon the arrival of a trailing edge of a note, the signal from the sensing system 23, 24 will change, this signal only affecting the inter-note time and distance counters 31, 29 which will be enabled so as to commence counting at rates determined by the real time and transport system clocks 33, 34 respectively.

After the passage of each pair of notes, the counter 29 will hold a count value which represents the distance between the trailing edge of an upstream note and the leading edge of the adjacent downstream note while the inter-note time counter 31 will hold a count value relating to the time which has elapsed between the passage of the trailing edge of the upstream note passing the sensor system 23, 24 and the arrival of the leading edge of the adjacent downstream note.

These counts are fed to an inter-note separation evaluator 35 which considers one or both of the counts in the counters 29, 31 and thus decides whether or not the inter-note separation is acceptable. For example, if it is determined that the distance or gap between successive notes is the important parameter then the count value from the counter 29 will be tested. Alternatively, the count value from the counter 31 could be tested, and in a further example some combination of the two count values could be tested. The nature of the test performed by the evaluator 35 is determined by the threshold parameter (T1) or parameters supplied to it.

If the evaluator 35 determines that the separation between notes is less than the minimum separation defined by the threshold parameters (T1) supplied to it, the evaluator 35 outputs a signal which causes the counter 26 to decrement and which preferably also causes the counter 28 to be reset to zero. Decrementing the counter 26 causes a lower value to be applied to the DAC 27 and hence the motor 101 will slow thus decreasing the feed rate of notes from the hopper 1 into the feed path 4 and increasing the inter-note separation.

In a similar manner to the counters 29, 31, the counters 30, 32 generate counts representing the distance or gap and the time respectively between the leading edges of successive notes. These count values are fed to a leading edge separation evaluator 37 which acts in a similar manner to the evaluator 35 to test a value which may be equal to one of the count values from the counters 30, 32 or a value derived from those counter values. The evaluator 37 evaluates and tests the separation between the leading edges by reference to parameter(s) T2 and if the separation is insufficient the evaluator 37 outputs a signal which causes the counter 26 to be decremented and which preferably causes the counter 28 to be reset to zero.

Preferably the system is organised such that the counter 26 can be decremented no more than once per note, even though the evaluators 35, 37 both indicate an insufficient separation.

As described above the signals which cause the counter 26 to decrement should preferably cause the counter 28 to be reset to zero as described. However, if they had no effect on the counter 28, or if they caused counter 28 to be decremented, the system would still function acceptably.

The count value in the counter 28 represents the number of notes which have passed along the feed path 4 without the need to slow down the picker motor 101. In other words, the count value in the counter 28 represents the success of the feed system. In order to optimise operation, it is desirable to obtain as high a feed rate as possible providing the separation constraints are satisfied. Thus, if the inter-note and leading edge separations are greater than necessary, notes will pass successively through the feed path 4 but at too great separation. The counter 28 will thus be incremented regularly and it is arranged that once the count value in the counter 28 reaches a predetermined threshold, the counter 26 is incremented so that the speed of the motor 101 is increased and at the same time the counter 28 is reset to zero.

The amount by which the counter 26 is decremented, the value which the counter 28 must reach before the counter 26 is incremented, and the amount by which the counter 26 is then incremented all serve to set the sensitivity and speed of response of the system. These three parameters may be preset, or may be adjusted according to an assessment of the prevailing operating conditions.

The following is an example of the calculation performed by the evaluator 35.

Let the inter-note time measured by counter 31 be T milliseconds, and let the inter-note distance measured by counter 29 be D millimeters.

The note speed S is therefore D/T millimeters per millisecond.

Suppose a diverter occupies 20 millimeters of the document path, and takes 15 milliseconds to cross the document path. The inter-note distance required to guarantee safe operation of the diverter is therefore 20 millimeters plus the distance travelled by a note in 15 milliseconds.

i.e. $20+(15\times S)$ mm or $20+(15\times D/T)$ mm.

It is advantageous to allow an extra safety margin, M millimeters say, to allow for imprecise measurement, etc.

The evaluator 36 must therefore determine whether the inequality $$D \geq 20+(15\times D/T)+M$$

is true or false, and must generate the output signal which decrements counter 26 if the inequality is false.

If there is no requirement to maintain a minimum gap between the trailing edge of one note and the leading edge of the next, the counters 29, 31, and evaluator 35 can be omitted.

If there is no requirement to maintain a minimum gap between the leading edges of consecutive notes, the counters 30, 32, and evaluator 37 may be omitted.

The counters used may be data locations in memory controlled by a computer or microprocessor or they may be constructed using conventional electronic or electromechanical hardware. Furthermore, a mixture of these types could be used for example some counts could be maintained in software and others in hardware.

We claim:

1. A method of feeding articles along a feed path defined by first and second separately driven feed systems in which the articles are fed from said first to said second feed systems, the method comprising sensing the separation between articles fed through said second feed system; and, during the feeding of articles by said feed systems, adjusting the rate at which articles are fed by said first feed system when the separation between successive articles passing through said second feed system does not satisfy at least one predetermined condition, where said second feed system operates at a substantially constant speed, and further comprising increasing said feed rate of the first feed system after a predetermined number of articles have passed through said second feed system without said at least one predetermined condition not being satisfied.

2. A method according to claim 1, wherein said adjusting step comprises adjusting the article feed rate of said first feed system so that the distance between the trailing edge of one article and the leading edge of the next article is maintained at or above a minimum value.

3. A method according to claim 1, wherein said sensing step comprising sensing the distance between leading edges of successive articles, and the adjusting step comprises adjusting said article feed rate of the first feed system so that the distance between the leading edges of successive articles is maintained at or above a predetermined minimum.

4. A method according to claim 1, wherein said sensing step comprises sensing the time between successive articles, and said adjusting step comprises adjusting the article feed rate of said first feed system so that the time between the trailing edge of one article and the leading edge of the next article is maintained at or above a minimum value.

5. A method according to claim 1, wherein said sensing step comprises sensing the time between leading edges of successive articles, and said adjusting step comprises adjusting the article feed rate of said first feed system so that the time between the leading edges of successive articles is maintained at or above a predetermined minimum.

6. A method according to claim 1, wherein said articles comprise sheets.

7. A method according to claim 6, wherein said first feed system draws said sheets from a sheet stack.

8. A method according to claim 1, wherein said first feed system is continuously operating.

9. A method according to claim 1, wherein said articles are substantially identical.

10. A method according to claim 1, wherein said articles comprise banknotes.

11. Apparatus for feeding articles, the apparatus comprising first and second separately driven feed systems, wherein said first feed system feeds articles to said second feed system, and wherein said second feed system operates at a substantially constant speed; a sensing system including a sensor for sensing the separation between articles fed through said second feed system; and control means responsive to said sensing system to adjust the feed rate of said first feed system during the feeding of articles by said feed systems when the separation between successive articles passing through said second feed system does not satisfy at least one predetermined condition, and further wherein said control means includes a counter for counting the number of articles which pass through said second feed system while said at least one predetermined condition is satisfied and for increasing the feed rate of said first feed system when said count exceeds a threshold.

12. Apparatus according to claim 11, wherein said sensing system monitors one or both of the inter-article separation and the separation between leading edges of the articles.

13. Apparatus according to claim 11, wherein the separation between articles is defined as one or both of a distance separation and a time separation.

14. Apparatus according to claim 11, wherein said control means comprises a first counter holding a count which defines the feed rate of said first feed system and which is incremented after the passage of the predetermined number of articles and which is decremented when a predetermined condition is not satisfied.

15. Apparatus according to claim 14, further comprising a second counter which generates a count value corresponding to the separation between successive articles, and a comparator for comparing the count value in said second counter with a minimum value, said comparator causing the count in the first counter to be decremented when the minimum count is not exceeded.

16. Apparatus according to claim 15, wherein two second counters are provided, one of which derives a count value related to the separation between the trailing edge of one article and the leading edge of the next article and the other of which detects the separation between successive leading edges.

17. Apparatus according to claim 11, wherein the articles comprise sheets, and wherein said first feed system draws said sheets from a sheet stack.

18. Apparatus according to claim 11, wherein said second feed system is the transport of an article sorting machine.

* * * * *